(12) United States Patent  
Menonna

(10) Patent No.: US 9,309,953 B2
(45) Date of Patent: Apr. 12, 2016

(54) DEVICE FOR POSITIONING AT LEAST ONE FUNCTIONAL ELEMENT

(71) Applicant: Mahle International GmbH, Stuttgart (DE)

(72) Inventor: Antonio Menonna, Ditzingen (DE)

(73) Assignee: Mahle International GmbH (DE)

( * ) Notice: Subject to any disclaimer, the term of this patent is extended or adjusted under 35 U.S.C. 154(b) by 79 days.

(21) Appl. No.: 14/203,536

(22) Filed: Mar. 10, 2014

(65) Prior Publication Data

US 2014/0251037 A1 Sep. 11, 2014

(30) Foreign Application Priority Data

Mar. 11, 2013 (DE) .......................... 10 2013 204 116

(51) Int. Cl.
| | | |
|---|---|---|
| *B21D 39/06* | (2006.01) | |
| *F16H 25/08* | (2006.01) | |
| *B23P 11/02* | (2006.01) | |
| *F16D 1/08* | (2006.01) | |
| *F16H 53/02* | (2006.01) | |
| *F01L 1/047* | (2006.01) | |
| *F16B 4/00* | (2006.01) | |

(52) U.S. Cl.
CPC .............. *F16H 25/08* (2013.01); *B23P 11/025* (2013.01); *F16D 1/0858* (2013.01); *F16H 53/025* (2013.01); *B23P 2700/02* (2013.01); *F01L 1/047* (2013.01); *F16B 4/006* (2013.01); *Y10T 29/49293* (2015.01); *Y10T 74/18056* (2015.01); *Y10T 74/18296* (2015.01)

(58) Field of Classification Search
CPC ..... F16H 25/08; F16H 53/025; F16D 1/0858; B23P 11/025; B23P 2700/02; Y10T 74/18296; Y10T 74/18056; Y10T 29/49293; F16B 4/006; F01L 1/047

See application file for complete search history.

(56) References Cited

U.S. PATENT DOCUMENTS

| 4,763,503 A * | 8/1988 | Hughes ................. B21D 53/84 164/342 |
| 2014/0173895 A1* | 6/2014 | Beerens ............... B23P 11/025 29/888.1 |

FOREIGN PATENT DOCUMENTS

| DE | 102006036140 A1 | 2/2008 |
| DE | 102007056638 A1 | 5/2009 |

(Continued)

OTHER PUBLICATIONS

European Search Report for EP14154342 dated May 9, 2014.

(Continued)

*Primary Examiner* — David Bryant
*Assistant Examiner* — Jun Yoo
(74) *Attorney, Agent, or Firm* — Fishman Stewart PLLC

(57) ABSTRACT

A device for positioning at least one functional element having a hub for a shaft in a predefined angle position on the shaft includes at least one holder for receiving at least one functional element. The device may include a tailstock or coaxially aligning the shaft in relation to the hub of the at least one functional element. The tailstock may include a centring cone for receiving the shaft. The centring cone may be axially displaceable in relation to the tailstock. The tailstock may include radially expandable centring elements for centring the functional element. The centring elements may assume a defined position against the hub of the functional element in an extended position. The device may also include a movable guide block for moving the shaft.

14 Claims, 3 Drawing Sheets

(56) References Cited

FOREIGN PATENT DOCUMENTS

| | | | |
|---|---|---|---|
| DE | 102008064194 A1 | 7/2010 |
| DE | 102009060350 A1 | 6/2011 |
| DE | 102011106981 A1 | 1/2013 |
| EP | 1392469 A1 | 3/2004 |
| GB | 2205054 A | 11/1988 |
| JP | 2000-073709 A | 3/2000 |

OTHER PUBLICATIONS

English Abstract for JP2000073709A.
German Search Report for DE102013204116.0, dated Feb. 27, 2014.
English abstract for DE102006036140.
English abstract for DE102009060350.
English abstract for DE102011106981.
English abstract for EP1392469.

* cited by examiner

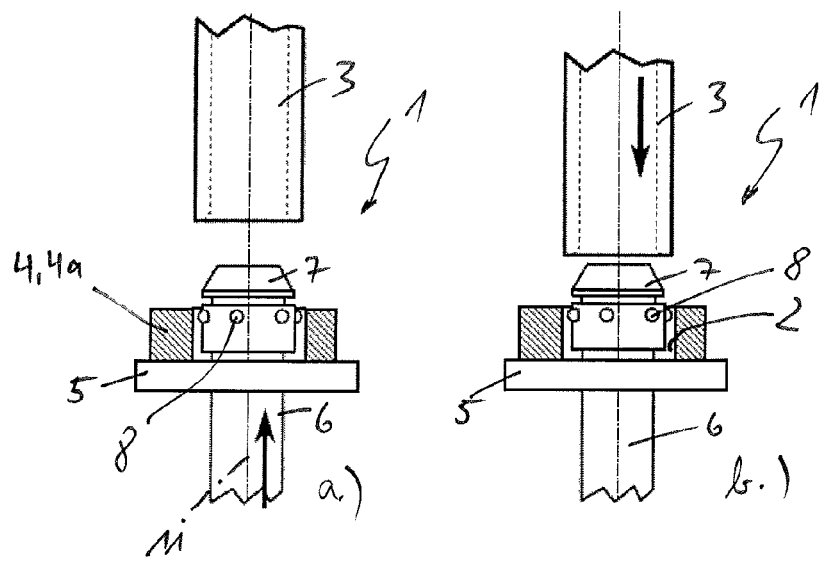
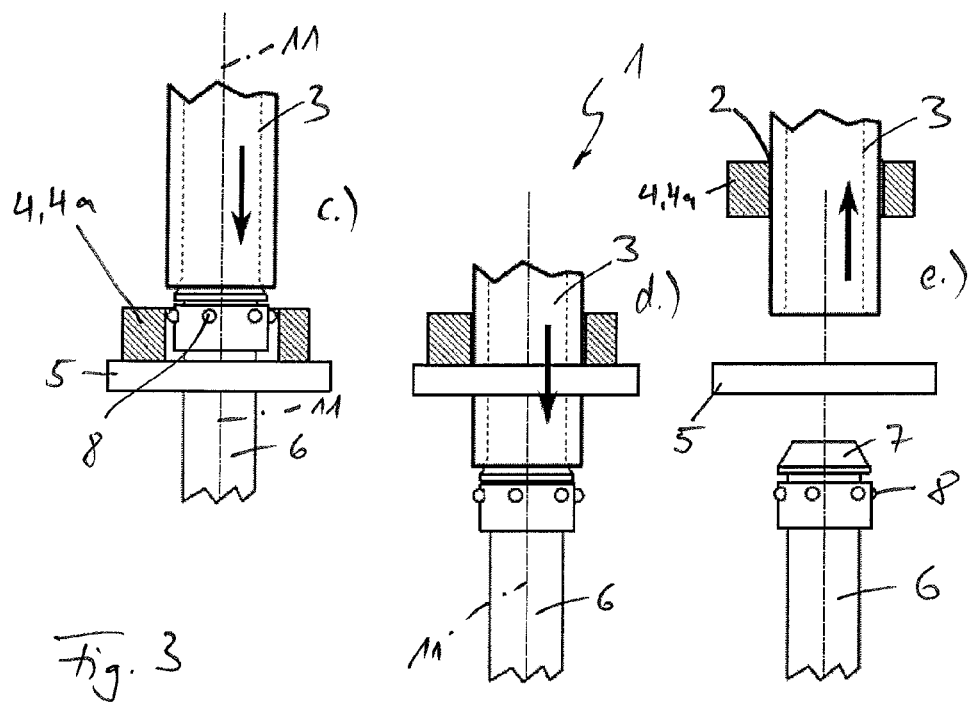
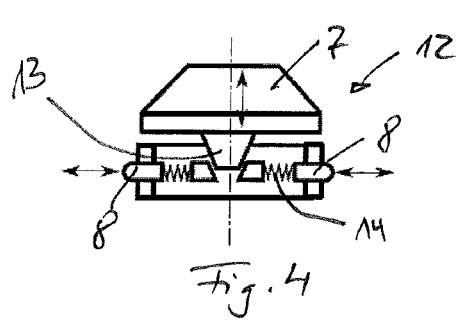
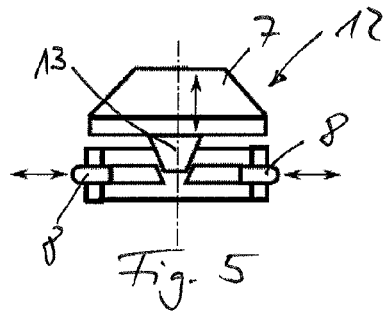
Fig. 3
Fig. 4
Fig. 5

DEVICE FOR POSITIONING AT LEAST ONE FUNCTIONAL ELEMENT

CROSS-REFERENCE TO RELATED APPLICATIONS

This application claims priority to German Patent Application No. 10 2013 204 116.0, filed Mar. 11, 2013, the contents of which are hereby incorporated by reference in their entirety.

TECHNICAL FIELD

The present invention relates to a device for positioning at least one functional element having a hub for a shaft, in particular a cam, according to the preamble of claim 1.

BACKGROUND

DE 10 2008 064 194 A1 discloses a generic device for positioning at least one functional element having a cut-out for a shaft in a predefined angle position on the shaft, the device having a holder intended for a functional element.

DE 10 2007 056 638 A1 discloses a further device for the installation of an assembly, consisting of at least one shaft bearing functional elements and a housing which supports the latter in continuous bearings, the said housing having positioning means which before joining hold the functional elements in a predefined phase position in the housing in such a manner that the at least one shaft can be pushed through the bearings of the housing and openings in the functional elements. The positioning means is in this case provided with cut-outs for the functional elements, which cut-outs have a stop, which supports the functional element counter to the join direction of the shaft, the cut-out of the positioning means having a partial contour of the contour of the functional elements as a negative profile, so that the functional elements can be held in a phase position in accordance with their subsequent join position. The partial contour of the cut-outs surrounds the functional elements, at least over some of their outer contour. This is intended to achieve particularly phase-precise positioning.

DE 10 2009 060 350 A1 discloses a device for installation of a shaft bearing functional elements, the device comprising a machine platform on which a plurality of positioning discs are arranged for the aligned, positionally correct positioning of the functional elements in such a manner that a shaft can be inserted. The positioning discs are fixed reversibly to a frame, which for its part is fixed reversibly to the machine platform. This is intended to make rapid changing of a production process possible by keeping several frames available.

DE 10 2006 036 140 A1 discloses a device for centring workpieces, having a centring pin, which is inserted into a spindle of a machine tool. The centring pin or its centring elements are actuated with the shifting means, which is present in any case in the spindle, so that an additional centring unit on the machine tool is no longer necessary.

DE 10 2011 106 981 A1 discloses a device for producing a join of at least one join part having a bore to a shaft, the device having a joining means having a first gripper for gripping the shaft and a second gripper for gripping the join part in a positionally oriented manner. The shaft is centrally clamped at one end in a clamping means, which is mounted such that it can be driven in a rotary manner, and is centred at the other end with a centring point, the join part being heated to a desired temperature and the bore widening to an excess in relation to the shaft diameter. This is intended in particular to create a device with which a joining process can be optimised.

EP 1 392 469 B1 discloses a method for the rotationally fixed fastening of a drive part having a bore to a shaft, the shaft projecting through the bore of the drive part(s). The join is made by shrinking.

The disadvantage of the devices according to the invention is however a comparatively complex guiding of the shaft during thermal joining

SUMMARY

The present invention is concerned with the problem of specifying an improved or at least an alternative embodiment for a device of the generic type, which in particular allows an optimised joining process.

This problem is solved according to the invention by the subject matter of the independent claims. Advantageous embodiments form the subject matter of the dependent claims.

The present invention is based on the general concept of equipping a generic device with a tailstock for the coaxial alignment of a shaft in relation to a hub of at least one functional element, the tailstock being formed in such a manner that it can align both the shaft and the functional elements relative to the shaft. The device is thus formed for positioning at least one functional element, which has a hub for the shaft, for example a cam on a camshaft, in a predefined angle position, at least one holder being provided, into which the functional element can be placed. The tailstock provided according to the invention has a centring cone, which can be shifted axially in relation to the said tailstock, for the shaft, and also additionally expandable centring elements for centring the functional element, the centring cone being coupled to the centring elements in such a manner that, when the centring cone is shifted axially, the centring elements are moved in the radial direction. If the tailstock, at the front end of which the centring cone is arranged, thus butts against an end face of the shaft, the centring cone is partially pushed into the shaft and thereby centres it, an axial displacement of the centring cone and thereby a radial extension of the centring elements taking place at the same time. In the extended position, the centring elements are in a defined position and thus produce a defined clearance from the hub, or the centring elements are jammed against the hub in the functional element and thereby fix the functional element. The device according to the invention additionally has a movable guide block for the shaft, by means of which the shaft for joining can be displaced simultaneously with the tailstock and in particular pushed through the hub of the at least one functional element. With the device according to the invention it is now possible to carry out an exact alignment of the hub and thus of the functional element, for example the cam, by means of the tailstock point. The centring elements on the tailstock point are formed in such a manner that when they are in the extended state they assume a very small clearance from the hub or are jammed against the hub of the functional element, whereas when they are in the retracted state they can easily pass through the hubs of the cams or functional elements. The centring elements are extended by moving the shaft end against the tailstock point, i.e. by butting the end face of the shaft against the centring cone. The centring cone, which centres the shaft, is thereby moved a little in the axial direction, which in turn effects the radial extension of the centring elements, for example by means of a corresponding shifting mechanism or a pneumatic or hydraulic adjustment means. With the tailstock according to the invention, the centring process of the functional elements relative to the shaft can be greatly simplified and therefore the joining process can be optimised overall.

At least three centring elements are expediently provided on the tailstock point. Three centring elements are at least necessary to be able to align the hub of the respective functional element optimally in relation to the shaft. Of course, the centring elements or a shifting mechanism actuating them are formed in such a manner that when the centring cone is shifted axially, a uniform radial shifting of the centring elements takes place. Of course, four or more centring elements can also be provided.

In a further advantageous embodiment of the solution according to the invention, a spring means is provided, which prestresses at least one centring element, preferably all the centring elements, in its or their extended positions. A defined contact force of the centring elements and thus a defined fixing force for the functional elements can be achieved thereby. The at least one spring means can be integrated in the tailstock point.

In general, the functional elements can be formed as balancing weights, gears or bearings, or else as cams, this list not being exhaustive, but it also being possible for further functional elements, in particular in the field of camshafts, for example sensor wheels, to be joined using the device according to the invention.

The present invention is also based on the general concept of specifying a novel method for thermally joining a shaft to at least one functional element having such a hub for the shaft, using the above-described device. In such a method according to the invention, first the shaft is cooled and/or the functional element is heated, whereupon the functional element is then placed into the associated holder of the device. This holder can for example have a negative contour of the functional elements, so that they can be accommodated therein in an angle-precise manner. It is likewise conceivable for the holder to have a stop, which allows rotation of the respective functional element only as far as an exactly predefined angle position. In a further method step, the tailstock is then moved into the hub until the centring elements lie in the hub. The shaft is then moved towards the centring cone of the tailstock by means of the guide block, so that the centring cone projects at least partially into the shaft and at the same time is displaced axially and thereby jams the centring elements against the hub of the functional element. The tailstock along with the functional element is then rotated into the correct angle position, whereupon the shaft can be pushed through the functional element. To fix the thermal join, a temperature equalisation which fixes the functional element on the shaft is awaited, so that in a last method step the shaft along with the functional element fixed thereon can be removed from the device. The first method step, namely the cooling of the shaft and/or the heating of the at least one functional element, does not of course have to be carried out first, but can also take place shortly before the actual joining to the shaft.

If a plurality of such functional elements are to be joined to a shaft with an above-described device, the alternative method described below is suitable, in which again the shaft is cooled and/or the functional elements are heated first. The functional elements are then placed into holders, which are arranged vertically one above the other, of the device with aligned hubs, whereupon the tailstock is moved from below through all the hubs of the functional elements. The shaft can then be moved towards the centring cone of the tailstock by means of the guide block, so that the centring cone is displaced axially and the centring elements are extended. In the same method step, centring of the shaft, which is perhaps still arranged slightly eccentrically, also takes place. In the subsequent method step, the tailstock along with the shaft is moved downwards and the tailstock is rotated at the same time. The shaft is however not rotated. When a hub is reached, the centring elements then jam in it, so that when the tailstock is rotated, the now associated functional element is also rotated in its holder, until it butts in an angle-precise manner against a predefined stop. The shaft is then pushed through all the functional elements; when the respective next functional element is reached, it is aligned continuously in terms of its angle position by rotation of the tailstock while the centring elements are jammed in the hub. To be able to complete the thermal join, a fixing temperature equalisation is then awaited until the shaft along with the functional elements fixed thereon can be removed from the device. An extremely precise and at the same time process-optimised join can likewise be achieved thereby.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
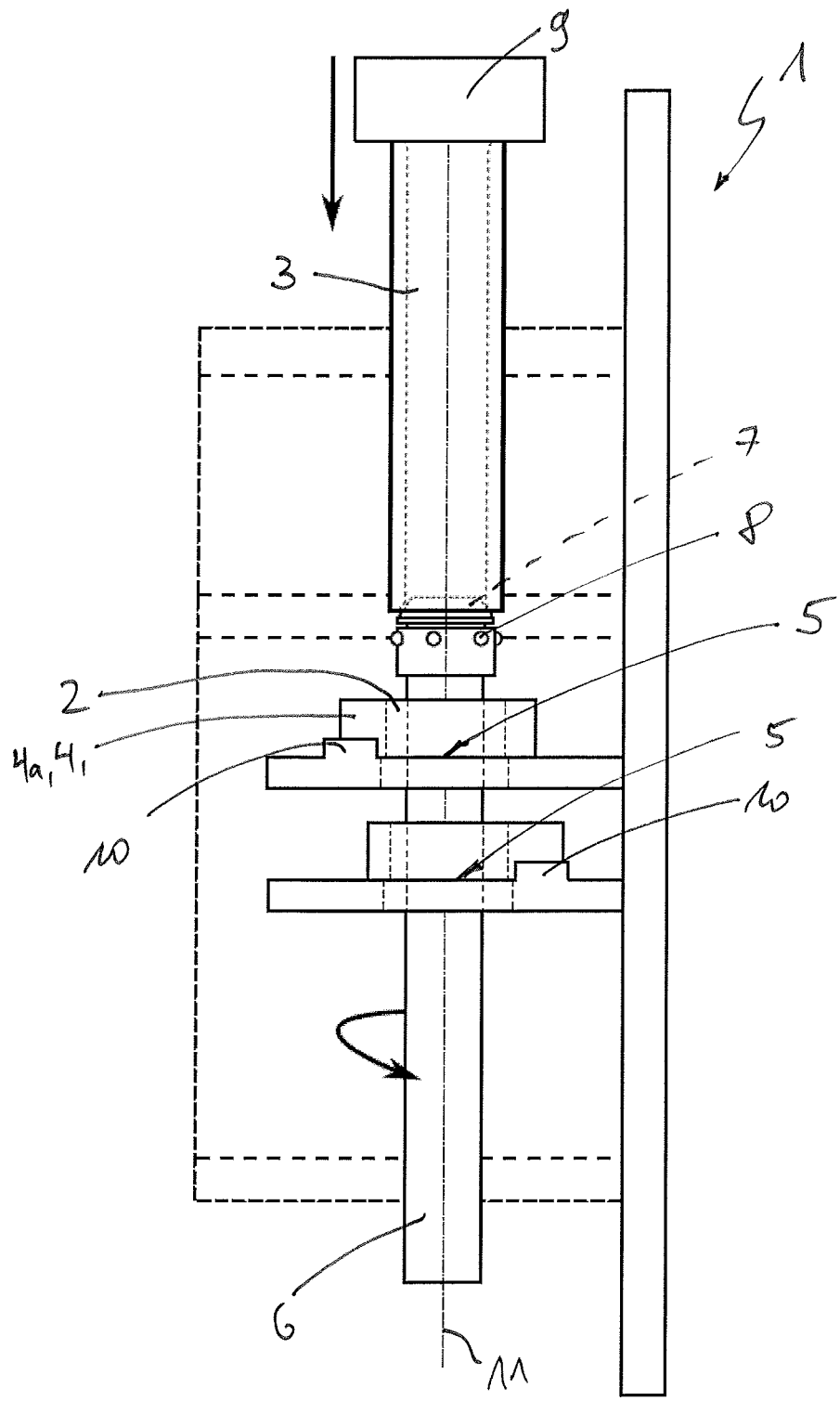
FIG. 1 schematically shows a schematic diagram of a device according to the invention, FIG. 2a-d schematically show individual method steps during the joining of a plurality of cams using the device according to the invention, FIG. 2e schematically shows a plan view of a tailstock with partially extended centring elements, FIG. 3a-e schematically show a method according to the invention for joining an individual cam using the device according to the invention, FIGS. 4 and 5 schematically show different embodiments of a tailstock point with centring cone and centring element.

According to FIG. 1, a device 1 according to the invention for positioning at least one functional element 4 having a hub 2 for a shaft 3, for example a cam 4a, in a predefined angle position on the shaft 3, has at least one holder 5 intended for a functional element 4. The device 1 according to the invention likewise has a tailstock 6 for the coaxial alignment of the shaft 3 in relation to the hub 2 of the at least one functional element 4. The tailstock 6 has on its point facing the shaft 3 a centring cone 7, which can be shifted axially in relation to the tailstock 6, for the shaft 3, and also expandable centring elements 8 for centring the functional element 4, for example the cam 4a, the centring cone 7 being coupled to the centring elements 8 in such a manner that, when the centring cone 7 is shifted axially, the centring elements 8 are moved in the radial direction. Such a coupling is shown for example in FIGS. 4 and 5. In an extended position, the centring elements 8 are jammed against the hub 2 in the functional element 4 and thereby fix the latter. Furthermore, the device 1 according to the invention has a movable guide block 9 for the shaft 3, by means of which the shaft 3 can be pushed from above through the hub 2 and the holder 5 and thereby the functional elements 4, 4a can be joined to the shaft 3. In the device 1 shown according to FIG. 1, two holders 5 are provided altogether, which each have a stop 10, which allows rotation of the functional element 4 accommodated in the holder 5 in each case only as far as a predefined angle position. Alternatively, the holder 5 can of course also have an at least partial negative contour of the functional elements 4, 4a, so that they can be accommodated in a precisely fitting, angle-precise manner therein. The functional elements 4 can for example be formed as balancing weights, gears, sensor wheels or else cams 4a.

Figure 2:
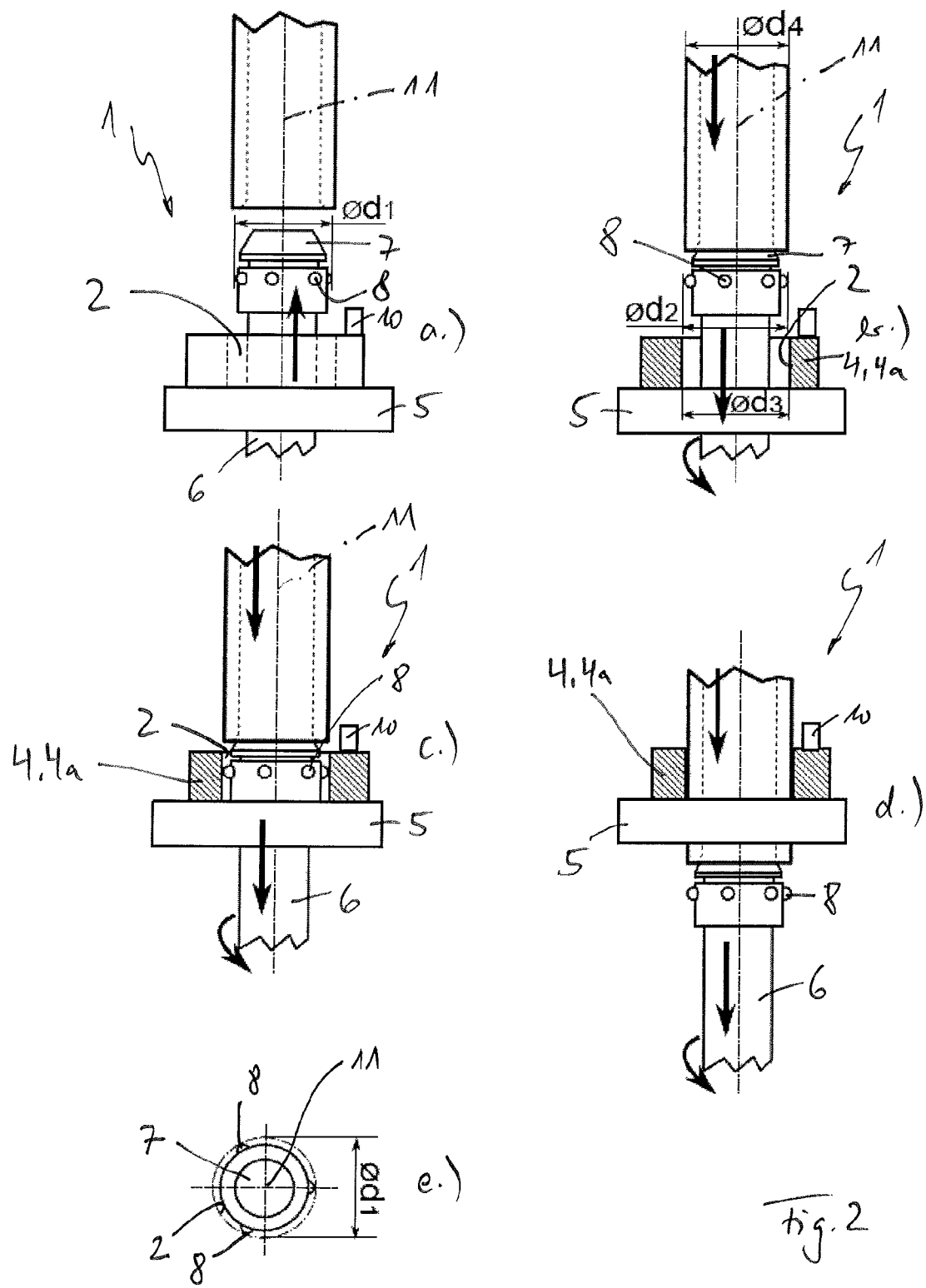

If FIG. 2e is viewed, it can be seen that at least three centring elements 8 are provided, which are extended and retracted preferably uniformly and thereby allow exact centring of the hub 2 and, by means of the latter, of the functional element 4 in relation to an axis 11, the axis 11 being the axis of the tailstock 6, the shaft 3 and the hub 2 at the same time.

To shift the centring elements 8, a shifting mechanism 12 can be provided, as is shown for example in FIGS. 4 and 5, a hydraulic or pneumatic adjustment means (not shown) of course also being conceivable. The shifting mechanism 12 can for example comprise a spreading cone 13, which is arranged on the centring cone 7 and shifts the centring elements 8 outwards in the radial direction, i.e. orthogonally to the axis 11, when the centring cone 7 is pushed down. Owing to the rounded outer point of the centring elements 8, they are automatically shifted back radially inwards when the centring cone 7 is relieved of load and when the tailstock 6 is displaced at the same time by butting against for example a hub 2. A spring means 14 can likewise be provided, which presses at least one centring element 8, preferably all the centring elements 8, against the hub 2 of the functional element 4 with a predefined contact force.

According to FIGS. 2a to 2d, individual method steps are now described for thermally joining a shaft 3 to a plurality of functional elements 4, which each have a hub 2 for the shaft 3, for example cams 4a, by means of the device 1 shown in FIG. 1. In the method according to the invention, first the shaft 3 and/or the functional element 4 are heated to make the thermal joining process possible in the first place. Then the functional elements 4 are placed into holders 5, which are arranged vertically one above the other, of the device 1 with hubs 2 aligned with each other. According to FIG. 2a, the tailstock 6 is then moved from below through all the hubs 2 of the functional elements 4, only one of the functional elements 4 being shown in FIGS. 2a to 2d. An outer diameter d1 of the retracted centring elements 8 is smaller than an inner diameter d2 of the hub 2, so the tailstock 6 with its centring point can be moved contactlessly through the hub 2. The shaft 3 is then placed onto the centring cone 7 with the guide block 9, as a result of which the centring elements 8 are moved radially outwards. At the same time, the shaft 3 together with the tailstock 6 is moved downwards until the centring elements 8 are spread in the hub 2 of the functional element 4, a simultaneous rotation of the tailstock 6 taking place according to FIGS. 2b and 2c, as a result of which the functional element 4, which is jammed by means of the centring elements 8, is rotated in the holder 5 until it butts against the stop 10 and thereby obtains its angle-precise alignment. The shaft 3 and the tailstock 6 are then moved further downwards, as a result of which the shaft 3 is pushed through the hub 2 of the functional element 4. The process according to FIGS. 2b to 2d is then repeated until the shaft 3 is pushed through all the functional elements 4, the tailstock 6 being rotated continuously in order to be able to rotate each newly received functional element 4 into its precise angle position before the actual joining to the shaft 3. All that remains is to wait for the temperature equalisation which fixes the join, in order then to be able to remove the shaft 3 along with the functional elements 4 fixed thereon from the device 1.

If the diameters d1 and d2 of FIGS. 2a and 2b are viewed, it can clearly be seen that the diameter d1 is smaller than the diameter d3. d3 refers to the hub diameter of the heated functional element 4. d4 is the diameter of the join fit on the shaft 3. In general, d2>d3, it being necessary for d3<d4. The clearance between extended centring elements 8 and hub 2 is smaller than the join clearance between heated functional elements 4 and shaft 3.

If, in contrast, FIGS. 3a to 3e are observed, an alternative method is shown here for the thermal joining of a shaft 3 to a functional element 4 having a hub 2 for the shaft 3, for example a cam 4a, by means of the device shown according to FIG. 1. In this method too, first the shaft 3 is cooled and/or the functional element 4 is heated, the functional element 4 then being placed into the associated holder 5 of the device 1. The tailstock 6 is then moved from below into the hub 2 until the centring elements 8 lie in the hub 2. The shaft 3 is then placed onto the centring cone 7 from above by means of the guide block 9, as a result of which the centring elements 8 are extended and at the same time jammed in the hub 2. This is shown in FIG. 3c. In the method step according to FIG. 3d, the shaft 2 is then pushed through the hub 2 of the functional element 4, whereupon, after a corresponding temperature equalisation process in the method step according to FIG. 3e, the shaft can be pulled upwards out of the holder 5 with the functional element 4 fixed thereon. In this case, the holder 5 has for example an at least partial negative contour of the functional element 4, so that it can be accommodated in an angle-precise manner in the holder 5.

In the two methods described above, the cooling of the shaft 3 and/or the heating of the functional element 4 does not of course have to take place at the start, but can also take place in an intermediate method step or for example by means of a heatable holder 5.

With the device 1 according to the invention and in particular with the method according to the invention, the process of joining functional elements 4, for example cams 4a, to an associated shaft 3, for example a camshaft, can be made much more reliable.

The invention claimed is:

1. A device for positioning at least one functional element having a hub for a shaft in a predefined angle position on the shaft, the device comprising:
    at least one holder for receiving at least one functional element,
        a tailstock for coaxially aligning the shaft in relation to the hub of the at least one functional element,
        the tailstock including centring cone for receiving the shaft, the centring cone axially displaceable in relation to the tailstock, and radially expandable centring elements for centring the functional element, wherein the centring cone is coupled to the centring elements such that, when the the centring cone is displaced axially, the centring elements move in a radial direction, wherein
    the centring elements assume a defined position against the hub of the functional element in an extended position, and
    a movable guide block for moving the shaft.

2. The device according to claim 1, wherein the defined position of the centring elements in the extended position includes a clearance from the hub of the functional element, the clearance being smaller than a clearance between the hub of the functional element and the shaft.

3. The device according to claim 2, wherein at least one of:
the holder has at least a partial negative contour of the at least one functional element for receiving the at least one functional element in an angle-precise position, and
the holder has a stop and the tailstock is rotatable.

4. The device according to claim 2, wherein the tailstock includes a shifting mechanism for actuating the centring elements.

5. The device according to claim 1 wherein the centring elements contact the hub of the functional element and fix the functional element in the extended position.

6. The device according to claim 5, wherein at least on of:
the holder has at least a partial negative contour of the at least one functional element for receiving the at least one functional element in an angle-precise position, and
the holder has a stop and the tailstock is rotatable.

7. The device according to claim 5, wherein the tailstock includes a shifting mechanism for actuating the centring elements.

8. The device according to claim 1, wherein the tailstock includes at least three centring elements.

9. The device according to claim 1, wherein the tailstock includes a shifting mechanism for actuating the centring elements.

10. The device according to claim 9, wherein the shifting mechanism is at least one of hydraulic and pneumatic.

11. The device according to claim 9, wherein the tailstock includes a spring for actuating the centring elements, the spring configured to prestress at least one centring element against the hub with a predefined force.

12. The device according to claim 1, wherein the tailstock includes a spring for actuating the centring elements, the spring configured to prestress at least one centring element against the hub with a predefined force.

13. The device according to claim 1, wherein at least one of:
the holder has at least a partial negative contour of the at least one functional element for receiving the at least one functional element in an angle-precise position, and
the holder has a stop and the tailstock is rotatable.

14. The device according to claim 1, wherein the at least one functional element includes at least one of a balancing weight, a gear, a cam and a bearing.

* * * * *